Nov. 7, 1961 H. F. MEYER 3,007,309
RAM JET ROTARY ENGINES
Filed March 22, 1961 2 Sheets-Sheet 1
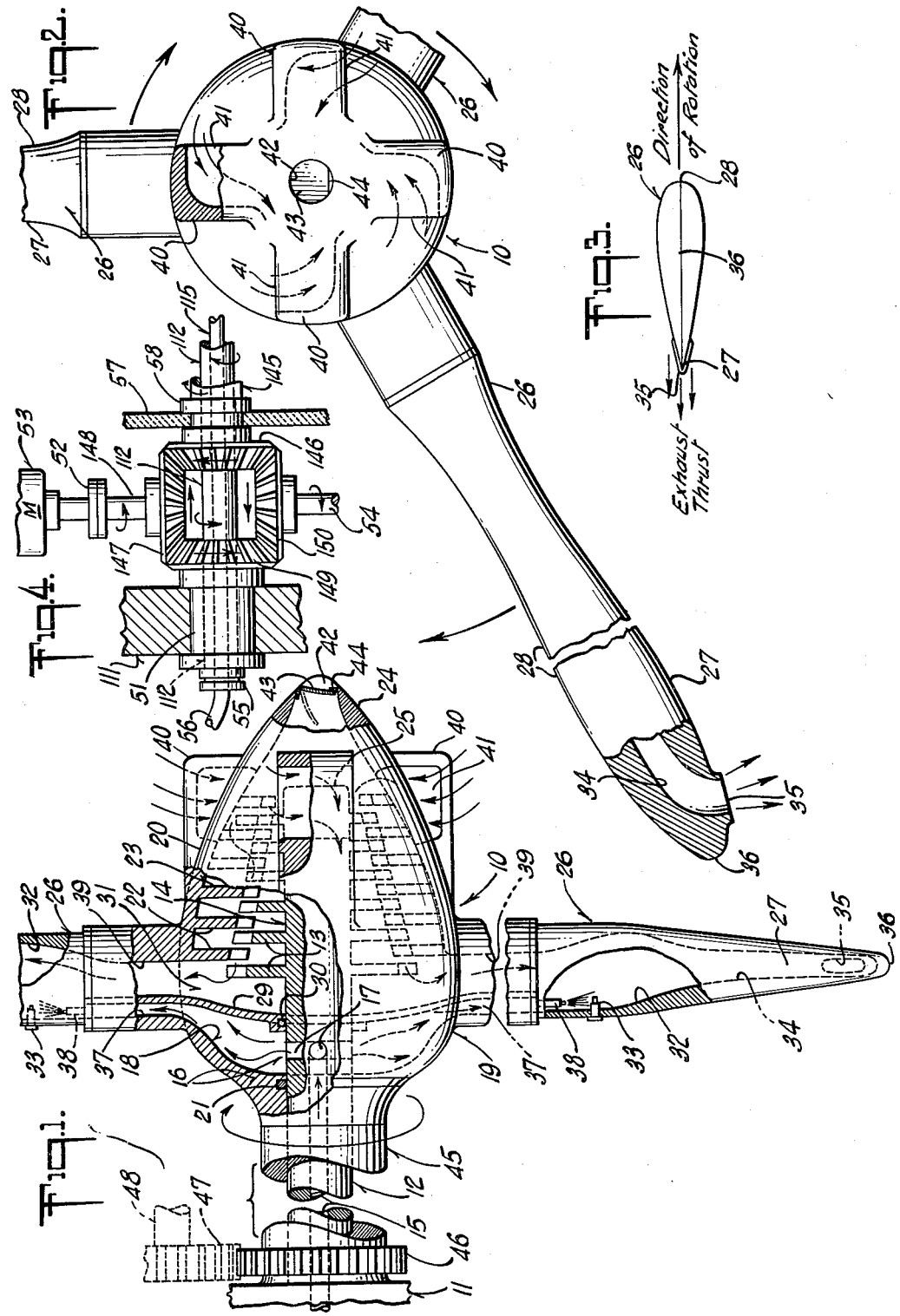

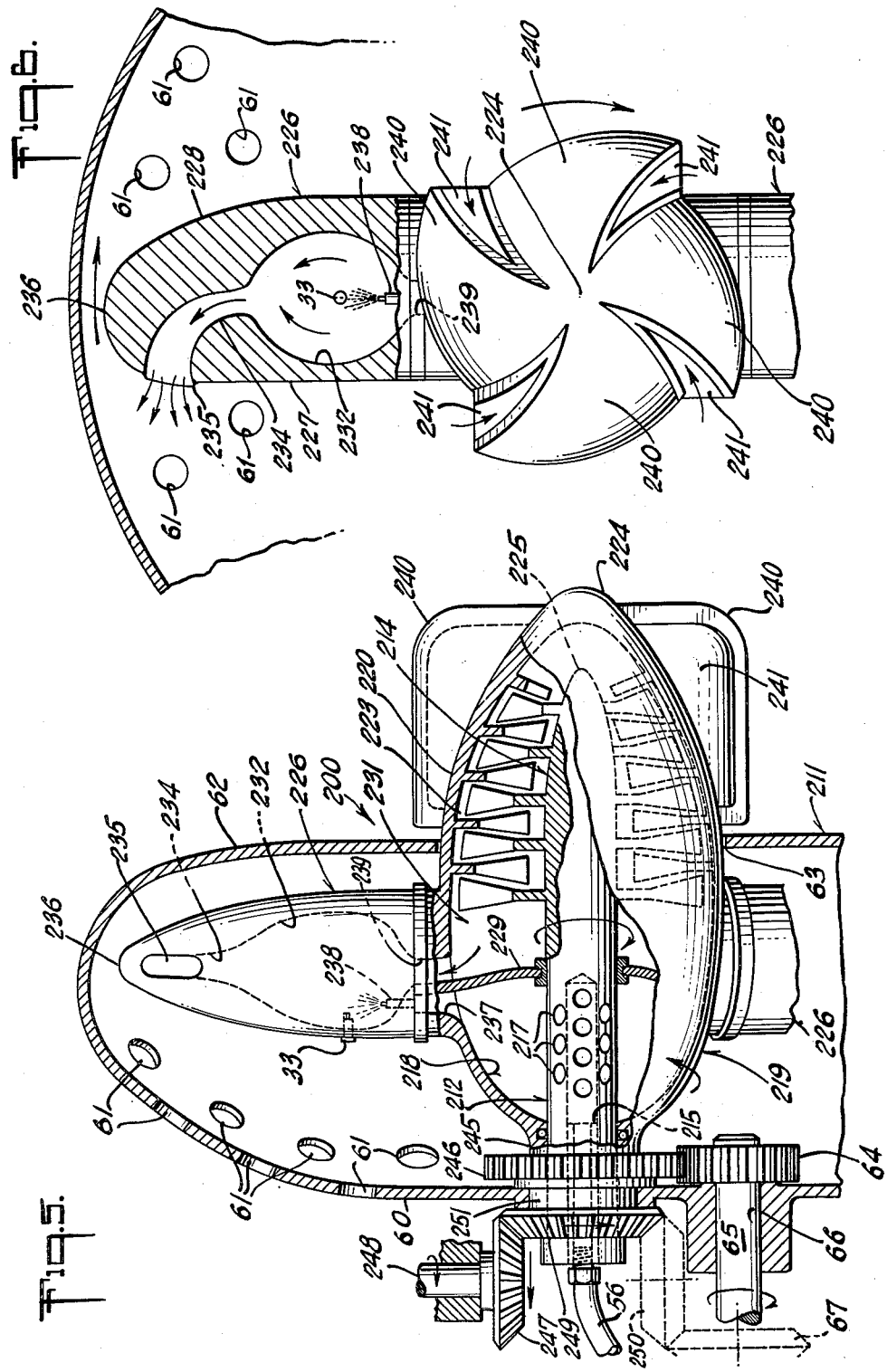

United States Patent Office 3,007,309
Patented Nov. 7, 1961

3,007,309
RAM JET ROTARY ENGINES
Howard F. Meyer, R.F.D. 1, Oyster Bay, N.Y.
Filed Mar. 22, 1961, Ser. No. 97,645
7 Claims. (Cl. 60—39.35)

The present invention relates to ram jet rotary engines which may be employed to advantage in the rotary wing structure of helicopters, air screws of propeller driven aircraft, and as the power units for drive of various mechanisms such as land and water vehicles, off-road machinery, etc.

A general object of the present invention is to provide such ram jet rotary engines which are of light weight and simple design, capable of efficient and quiet operation on standard fuels, inexpensive to manufacture, capable of high speeds while being practically free of vibration, and which are effectively maintained economically.

A more specific object of the invention is to provide a ram jet rotary engine in a form in which a jet driven spinner assembly thereof is rotatably mounted about an air supply compressor shaft serving effectively as the sole support for the engine.

Another object of the invention is to provide such a ram jet engine in which the jet driven spinner assembly has a rotary air supply compressor housing hub equipped with suitable air intake means including scoops to feed or ram air under elevated pressure to the compressor upon rotation of the spinner assembly, efficiently assuring ease of starting.

A further object of the invention is to provide embodiments of such ram jet engines that are desirable for use as rotary air screws to operate propeller driven fixed wing aircraft and as the rotary wing structures of helicopters that supplement the rotary operable air scoop intake of the hub compressor with a supplemental hub nose intake passage controlled by pressure differential operable valve means permitting additional intake of air to the compressor under elevated pressure during certain periods of forward drive of the nose through the atmosphere, which improves cruising speed operation and effects fuel economy in the lateral flight of fixed wing aircraft and the vertical ascent operation on take-off of helicopters.

A still further object of the invention is to provide embodiments of the engine of the present invention which are economically constructed and assembled in mass production and which allow efficient use and operation in a variety of services, as will be apparent from the descriptions of the embodiments hereinafter set forth.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a side view, with parts broken away and in section, of an embodiment of the ram jet rotary engine of the present invention, which may be suitable for use as the rotary wing structure of a helicopter, or with proper shaping of the rotor blades may serve as an air screw for propeller driven types of aircraft;

FIG. 2 is a front view, with parts broken away and in section, of the engine structure shown in FIG. 1;

FIG. 3 is a tip end view of one of the rotor blades or rotary wing arms of the engine shown in FIGS. 1 and 2;

FIG. 4 is a plan view, with parts broken away and in section, of a modified form of engine mount illustrated in FIG. 1, and showing means associated therewith for providing differential motions of concentric shafts constituting parts of or associated with cooperative assemblies of an air compressor embodied in the engine;

FIG. 5 is a side elevational view, with parts broken away and in section, of another embodiment of the engine of the present invention, which may be particularly useful as a power unit for drive of various devices such as land or water vehicles and off-road machinery; and FIG. 6 is a front end view of the engine illustrated in FIG. 5, with parts broken away and in section.

It will be seen from the embodiments of the engine illustrated by way of example in the drawings that the present invention effectively includes the following features and unique combinations thereof. In these ram jet engines is embodied an air compressor having a bladed axial assembly including a stub shaft, and a surrounding hollow bladed rotary casing assembly having a nose section beyond the bladed axial assembly with the casing assembly gasketed at its inner opposite end about the shaft for relative rotation in one direction about the latter as a hub unit. Means are provided for supporting the inner end of this stub shaft externally of the gasketed inner end of the hub unit and with this supporting means providing the sole support of the engine. This support feature is employed to advantage in embodiments of the present engine which may hold fixedly the bladed axial assembly of the air compressor including the stub shaft, or which may provide for rotation of this stub shaft and its bladed axial assembly counter to the direction of rotation of the hub unit. The rotary hollow hub unit is provided with means which transversely subdivides its interior into an air feed chamber in which the bladed axial assembly of the compressor is housed and an annular fuel feed chamber about a section of the stub shaft intermediate the air feed chamber and the gasketed inner end of the rotary hub unit. In embodiments of this engine means define fuel supply passages through to the supported inner ends of the stub shaft thereof which lead to and communicate with the fuel feed chambers. The hub unit of each also includes means defining at least one compressor air supply scoop on the side of the nose section of the hub which has an air intake opening facing in the direction of rotation of the latter communicated to the air feed chamber for ramming air thereinto upon hub rotation. A plurality of hollow radial arms are fixedly mounted or carried by the rotary hub unit and constitute with the latter a spinner assembly with each arm having a trailing side and an igniter means-equipped, internal combustion chamber which is vented through an exhaust opening in its trailing side to give propulsive thrust to the spinner assembly. Means also define in each of the radial arms separate air supply and fuel supply ducts communicating the combustion chamber respectively to the air feed and fuel feed chambers.

In the drawings, in which like numerals identify similar parts throughout, an embodiment of the present invention suitable for use in aircraft as a power plant is illustrated in FIGS. 1 to 3 inclusive thereof. The embodiment of the ram jet engine 10 there illustrated may be the rotary wing assembly of a helicopter with the spinner arms or rotor blades thereof having airfoil section. The support for this engine may be suitable frame structure, such as the fuselage, a portion of which is illustrated at 11, on which is fixedly mounted or supported stub shaft 12 extending therefrom, with this shaft carrying on its far or outer end a plurality of radial compressor blades 13 of an air compressor, which may be of conventional form, constituting with this section of the stub shaft a bladed axial assembly 14. Such air compressor may be of generally conventional type, preferably of the multiple-stage, axial flow form having a bladed axial assembly and a cooperating bladed casing unit interfitted about the axial assembly, but of a construction wherein the rotor unit is the casing unit and the stator unit is the bladed axial assembly housed therein with the latter either being non-rotatable or rotatable in a reverse direction, as will appear hereinafter. A fuel feed passage 15 is provided longitudinally through the supported inner end section of the stub shaft 12 and may be in the form of an axial bore extending from a suitable pressurized fuel supply in the fuselage to a fuel feed locality at 16 inwardly of the bladed axial assembly 14. This inner end section of the stub shaft 12 has at least one transverse duct 17, and preferably a plurality thereof, extending radially from the axial duct 15 to the exterior of the shaft for supply of fuel to an annular fuel feed chamber 18 defined thereabout, as is explained hereinafter.

A hollow hub 19 is coaxially arranged about and rotatably supported on and by the stub shaft 12 with the hub surrounding the fuel feed locality at 16 and having an outer section 20 housing the bladed axial compressor assembly 14. The inner end of the hub 19 is suitably gasketed in a fluid-tight manner about the stub shaft 12 inwardly of the fuel feed locality 16 by any suitable means, such as conventional gasketing structure, diagrammatically illustrated by way of example at 21. The rotary hub 19 carries within its outer section 20 a set of radial blades 22, which may also be of conventional formation, cooperatively associated with the blades 13 of the bladed axial assembly 14, and providing bladed casing unit 23 of the compressor interfitted with the axial unit. The outer hub section 20 has a nose 24 extending beyond the outer end 25 of the stub shaft, i.e., beyond the compressor axial assembly 14.

A plurality of hollow radial arms, in the form of rotor blades 26, are fixedly supported by the rotatable hub 19, which if desired, may be three in number located 120° apart, as will be best seen in FIG. 2. The hollow radial arms 26 or rotor blades of airfoil section and the rotatable hub 19 on which they are fixedly supported together constitute a spinner assembly intended for driven rotation in one direction with each arm having a trailing side or edge 27 and a leading side or edge 28.

Transverse wall means 29 within the hollow hub 19 is provided with an axial hole 30 through which stub shaft 12 is suitably gasketed beyond the fuel feed locality at 16 and rearwardly of the compressor section, there subdividing the space within the hub into an air feed chamber 31 and the fuel feed chamber 18. Each of the radial arms or rotor blades 26 has a combustion chamber 32 defined therein and equipped with suitable igniter means, such as a glow plug 33 to which electrical current may be supplied by conventional circuit means inclusive of slip rings and brushes (not shown). At least the outer end section of each of the radial arms 26 in which the combustion chamber 32 is provided may be either lined with or constructed from heat resistant material, such as suitable steel or alloy. Each combustion chamber 32 is vented through an outwardly extending exhaust passage 34 and an exhaust opening 35 in the vicinity of tip 36 of the arm or rotor blade 26 and in its trailing side as will be understood from FIGS. 2 and 3. An air supply duct 37 extends longitudinally through the butt portion of each of the spinner arms or rotor blades 26 and communicates the fuel feed chamber 18 with the combustion chamber 32 through a spray nozzle 38 adapted to atomize fuel into the combustion chamber in the vicinity of the igniter or glow plug 33. Another duct 39 also extends longitudinally through the hub section of each rotor blade or spinner arm 26 and communicates the air supply chammber 31 with the combustion chamber 32.

The air intake for the compressor is comprised of at least a main supply in the form of a plurality of circumferentially-spaced air scoops or hoods 40 provided on the sides of the outer hub section 20 and symmetrically arranged at circumferentially-spaced points thereabout. Such air scoops 40 may be equal in number to the number of spinner arms of rotor blades 26, or there may be a different number thereof, such as four arranged at 90° apart, as is indicated in FIG. 2. Each air scoop 40 has an air intake opening 41 facing in the direction of rotation of the spinner assembly communicated inwardly to the compressor housed in hub section 20. This main air intake provided by the air scoops 40 preferably is supplemented by supplemental air intake when the ram jet engine is designed to serve as one or more of the power units of aircraft so that its nose is axially forced or travels forward through the atmosphere. As is indicated in FIGS. 1 and 2 such supplemental air supply may be in the form of an intake opening 42 provided axially in the nose 24 and in which is pivotally mounted a flap valve 43 responsive to a differential in pressure on opposite sides thereof, i.e., the internal pressure in the compressor and the external atmospheric pressure, and adapted to swing forward to closing position against suitable stop means 44.

In the embodiment of the ram jet engine illustrated in FIGS. 1 and 2, the inner end of the hub housing 19 may be provided with a tubular extension 45, in the form of a hollow shaft rotatably supported about the fixed butt end of stub shaft 12. The hollow hub shaft 45 may be provided with means initially to drive it for purposes of starting. For example, the hollow hub shaft 45 may have fixed thereon a spur gear 46 suitably meshed with driving gear means, such as spur gear 47 indicated in dotted lines in FIG. 1, with this latter spur gear suitably provided with a driving shaft 48 which may be drivably connected to any suitable power source, such as an electric motor (not shown), through suitable clutch means, such as an overrunning clutch. The driving spur gear 47 or the driven spur gear 46 may also be suitably connected to means to drive accessories of the craft when the engine is running.

In certain embodiments it may be desired to drive the bladed axial assembly 14 of the compressor in a direction opposite to the rotation of the spinner assembly including the bladed hub assembly 23 of the compressor so as to build up the internal pressure in the compressor rapidly when the engine is started and also to maintain a relatively high internal pressure during engine operation. This may be attained by means, such as those illustrated in FIG. 4 which includes means to obtain differential motions of the concentric stub shaft 112 and the surrounding hollow hub shaft 145. As is illustrated in FIG. 4, such differential motion device may be in the form of box gearing comprising four meshed bevel gears 146, 147, 149 and 150. One of the bevel gears of an axially-spaced, oppositely rotatable pair 146 and 149 is fixed to or fixedly mounted on the hollow shaft 145 carried by the rotary hub, such as that illustrated at 19 in FIGS. 1 and 2, and the other thereof upon the stub shaft 112. The hollow hub shaft 145 may carry the bevel gear 146, and the butt end of stub shaft 112 extends therethrough and then back through the bevel gear 149 carried by this stub shaft and an engine supporting bearing 51 mounted in the supporting frame structure 111. Intermediate bevel gear 147, which is intermeshed with the opposite pair of bevel gears 146 and 149, is fixedly mounted to drive shaft 148 which in turn in connected through a suitable overrunning clutch device 52 to a suitable driving power unit or starting motor 53. The other intermediate bevel gear 150 may be an idler or it may have fixed thereto a driving shaft 54 for the drive of accessories of the craft.

It will thus be understood from FIG. 4 that even though the stub shaft 112 is adapted to be driven in a direction opposite to the rotation of the hub of the spinner assembly it constitutes the sole means of support for the engine by rotational mount through bearing 51 supported by the frame structure 111. When the stub shaft 112 is to be so driven in the opposite direction, the fuel supply passage may be provided in the form of a tube 115 extending through an axial bore therein and suitably connected beyond the inner supported end of the stub shaft, such as at 55, to a fuel supply conduit 56 leading from a pressurized fuel supply. A section of the fire wall of the nacelle is indicated at 57 in FIG. 4 which carries a bearing unit 58 through which the hollow hub shaft 145 is rotatably extended, but such fire wall has no appreciable engine-supporting strength and the sole or main support of the engine is provided by the frame structure 111 and the bearing unit 51 carried thereby in which is rotatably mounted the butt end of stub shaft 112.

In operation of the ram jet rotary engine illustrated in FIGS. 1 to 3 inclusive, let it be assumed that this is in the form of the rotary wing structure of a helicopter with the rotor blades 26 having airfoil section. With the fuel supply passage 15 suitably connected to a pressurized source of conventional fuel, such as gasoline, and the rotary hub 19 suitably connected to starting drive mechanism, such as through its hollow shaft 45 and drive gear 46, rotation of the spinner assembly will cause the air intake scoops 40 to be rotated into the atmospheric air to force or ram air into the compression chamber of the compressor and there to compress the intake air immediately upon rotation of the spinner assembly even though the aircraft is in an idling position. Pressurized fuel is supplied to the fuel feed chamber 18 and compressed air is supplied to the air feed chamber 31. The fuel is distributed through the radial supply passages 37 to the spray nozzles 38 in the rotor blade combustion chambers 32, and the rotation of the spinner assembly causes the fuel to be supplied to these spray nozzles by centrifugal action supplementing the pressure feed from the pressurized fuel source. The compressed air is delivered from the air feed chamber 31 through the radial passages 39 also to the combustion chambers 32. The air and fuel mixtures in the latter are then fired by the glow plugs 33 and the exhaust gases pass out through the exhaust passages 34 and the exhaust openings 35 in the tips of the rotor blades 26 to drive the spinner assembly, such as by rotating it clockwise as viewed in FIG. 2.

The supplemental air supply through the nose passage 42, which is controlled by the flap valve 43, is opened and closed during changes in air pressures within the rotary hub air feed chamber 31. The flap valve 43 will open only during the ascent of a helicopter equipped with such a ram jet rotary wing engine when the frontal pressure of rushing air overcomes the internal pressures developed by the air scoops 40 and the compressor. This is of importance since additional power is needed in the operation of helicopters during vertical ascent and is not needed during descent. When such an embodiment of the ram jet rotary engine of the present invention, illustrated by way of example in FIGS. 1, 2 and 3, is modified so that the spinner arms 26 are in the form of air screw propeller blades the frontal intake in the nose of the hub at 42 improves cruising speeds and fuel efficiencies in normal flight and in take-offs and landings, the forward movement of the propeller driven aircraft developing the frontal pressure so that when it is greater than the internal pressure of the compressor and that developed by the air scoops, the flap valve 43 will be opened to ram more air into the compressor.

The ram jet rotary engine of the present invention may be embodied in a small unit as the power source for drive of various mechanisms, such as land or water vehicles, off-road machinery, and for various other purposes, and may be in a form similar to that illustrated in FIGS. 5 and 6. The ram jet rotary engine 200, illustrated in FIGS. 5 and 6 by way of example, may be provided with supporting frame structure in the form of a housing 211 suitably mounted upon a supporting base (not shown).

The hollow casing 211 suitably supports the butt end of stub shaft 212, such as by means of a bearing 251 mounted in a hole in rear wall 60 of the housing. The rear wall 60 of the hollow casing or housing 211 is also provided with suitable exhaust passages, which may be in the form of a large hole or provided by a plurality of distributed small holes 61, the plurality of small holes being capable of suppressing noise when of certain configuration and size to raise the frequency to a supersonic range.

As in the embodiments of FIGS. 1 to 4 inclusive, the stub shaft 212 is surrounded by a rotary hub 219 with the outer end 225 of the stub shaft being provided with blades to constitute the bladed axial assembly 214 and with the outer nose section 220 of the hub also being internally bladed to constitute the cooperating bladed casing unit 223 of the compressor interfitted about the axial assembly unit. The front wall 62 of the casing or housing 211 is provided with a large hole 63 through which the hub nose section 220 freely extends, to carry therebeyond a plurality of circumferentially-spaced air scoops 240, each having an air intake opening 241 communicated to the interior of the hub and the compressor therein.

Also as in the embodiments of FIGS. 1 to 4 inclusive, the space in the hollow hub 219 is subdivided by a transverse wall 229 to define a fuel feed chamber 218 and an air supply chamber 231. The butt end of stub shaft 212 extends out through the engine support bearing 251 and carries fixed thereon a bevel gear 249 meshed with another bevel gear 247 suitably driven by a starting drive shaft 248, which may also be suitably connected for drive of accessories beyond overrunning clutch mechanism employed to connect this shaft to the starting motor.

The fuel feed chamber 218 is supplied with fuel through a plurality of radial ducts 217 communicated to a fuel supply tube 215 mounted in an axial bore of the stub shaft and connected inward of the driving gear 249 to a suitable fuel supply conduit 56. Each of a plurality of spinner arms 226 which are fixedly carried by the rotary hub 219 has an internal combustion chamber 232 therein communicated by a radial exhaust passage 234 to an exhaust opening 235 near the tip 236 of each arm, with this exhaust opening facing rearwardly in the trailing side of the arm. The annular fuel feed chamber 218 is connected in each arm by fuel supply passage 237 centrifugally to feed fuel to the spray nozzle 238 mounted in the combustion chamber 232, in the near vicinity of a firing glow plug 33.

Power is taken off from the rotating hub 219 of the spinner assembly by any suitable means and it may be in the form of a spur gear 246 fixed upon the hollow inner end 245 of the hub which is rotatably arranged about stub shaft 212. Driving spur gear 246 may be meshed with a pinion 64 carried by a drive shaft 65 suitably journaled at 66 through the rear wall 60 of the housing 211.

In operation of the ram jet rotary engine of FIGS 5 and 6, it may be started in a manner similar to that proposed for the embodiments of FIGS. 1 to 4 inclusive. For example, with the drive shaft 248 connected through an overrunning clutch to a starting motor, gears 247 and 249 may drive the stub shaft 212 in a counterclockwise direction as viewed from the front of the engine or its nose 224. The engine may be started more readily if the hub 219 is driven in the opposite direction, i.e., clockwise. Suitable gearing may be employed for this purpose in association with the main drive shaft 65, pinion 64 and spur gear 246, such as a double bevel gear indicated in dotted lines at 250 meshed with a beveled gear indicated in dotted lines at 67 and suitably fixed on the main drive shaft 65. By so gearing the stub shaft 212 and the spinner assembly, including its hub 219, for drive in opposite directions, the compressor within the hub will quickly raise the compression of the air supply in air feed chamber 231 for ram jet operation of the engine.

Such opposite rotation of the stub shaft 212 and the hub 219 may be maintained by such gearing during ram jet operation of the engine, with the starting motor disengaged from the gearing by the overrunning clutch. Rotation of the hub 219 causes the air scoops 240 to ram air into the compressor and, with the latter operating, high compression of intake air is maintained to be constantly fed through air supply passages 239 to the combustion chambers 232 for mixture with the centrifugally supplied fuel through spray nozzles 238 and firing by the glow plugs 33, causing exhaust gases to flow from the exhaust openings 235 and drive the spinner arms 226 and the remainder of the spinner assembly including hub 219 clockwise. As in the FIG. 4 embodiment, pressurized fuel is supplied through the conduit 56 and suitable coupling to the tube 215 in the socket bore of the stub shaft for delivery out through the ducts 217 into the annual fuel feed chamber 218 and flow out through the arm ducts 237 to the spray nozzles 238. Since spur gear 246 is fixed upon the hollow shaft extension 245 of the hub 219, power is transmitted thereby through pinion 64 to the main drive shaft 65.

Since in all embodiments the butt end of the stub shaft of the compressor extends beyond all other parts of the engine mechanism to serve at least as the chief support of the engine unit this arrangement of parts assures simplicity of structure in providing an additional mechanism for control of or changing the pitch of the blades of air screw or propeller embodiments. The butt end of stub shaft outwardly beyond its anchorage to engine support structure may be surrounded by a rotary sleeve geared to gears carried by the rotary blade shanks, this sleeve in turn being mechanically connected for drive to any suitable control apparatus.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A ram jet engine comprising, in combination, an air compressor having a bladed axial assembly including a stub shaft and a surrounding hollow bladed rotary casing assembly having a nose section beyond said bladed axial assembly and gasketed at its inner opposite end about said shaft for relative rotation in one direction about the latter as a hub unit, means supporting the inner end of said stub shaft externally of said gasketed inner end of said hub unit as the sole support of said engine, means transversely subdividing said rotary hollow hub unit into an air feed chamber in which said bladed axial assembly is housed and an annular fuel feed chamber about a section of said shaft intermediate the latter and said gasketed inner end of said rotary hub unit, means defining a fuel supply passage through the supported inner end of said stub shaft leading to and communicating with said fuel feed chamber, means defining at least one compressor air supply scoop on the side of said hub nose section having an air intake opening facing in the direction of rotation of said hub unit communicated to said air feed chamber, a plurality of hollow radial arms fixed on said rotary hub unit constituting together a spinner assembly with each arm having a trailing side and an igniter means-equipped internal combustion chamber vented through an exhaust opening in its trailing side to give propulsive thrust to said spinner assembly, and means defining in each of said radial arms separate air supply and fuel supply ducts communicating said combustion chamber respectively to said air feed and fuel feed chambers.

2. A ram jet engine comprising, in combination, supporting frame structure, a stub shaft supported on and extending from said frame structure and carrying on its far end radial compressor blades of an air compressor together constituting a bladed axial assembly of the latter, means defining a fuel feed passage extending longitudinally in said shaft from said frame structure to a fuel feed locality inwardly of said bladed axial assembly, said shaft having at least one transverse duct communicating said passage to the exterior of said shaft in said locality, a hollow hub rotatably supported on and by said shaft and surrounding the fuel feed locality with an outer section thereof housing said bladed axial assembly, the inner end of said hub being gasketed to said shaft inwardly of said fuel feed locality and with said outer hub section constituting a rotary cooperating bladed casing unit of said compressor interfitted with said compressor axial assembly and having a nose extending beyond the end of the latter, a plurality of hollow radial arms fixedly supported by said rotatable hub and constituting therewith a spinner assembly intended for driven rotation in one direction with each arm having a trailing side, transverse wall means in said hollow hub having an axial hole through which said shaft is gasketed beyond said fuel feed locality and rearwardly of said compressor section subdividing the space in said hub into an air feed chamber and a fuel feed chamber with said duct communicating with the latter, each of said radial arms having a combustion chamber therein equipped with igniter means and vented through an exhaust opening in the trailing side of said arm with an air supply duct communicating said air feed chamber to said combustion chamber and a centrifugal fuel supply duct communicating the latter to said fuel feed chamber, and means defining a plurality of circumferentially-spaced air scoops on the sides of said outer hub section having air intake openings facing in the direction of rotation of said spinner assembly communicated inwardly to said compressor housed therein.

3. The ram jet engine as defined in claim 2 characterized by said hollow hub section being provided forward of said scoops with a supplemental air intake opening in its nose leading to said compressor, and a valve controlling intake flow through said supplemental air intake opening openable by a differential in pressure between greater outside pressure and lesser inside pressure.

4. The ram jet engine as defined in claim 3 characterized by said valve being an inwardly openable flap valve.

5. The ram jet engine as defined in claim 2 characterized by said stub shaft being rotatably supported by said frame structure, and means to drive said shaft in a direction opposite to the rotation of said spinner assembly.

6. The ram jet engine as defined in claim 5 characterized by said driving means including means to drive said shaft and said hub in opposite directions and starting motor means connected thereto.

7. The ram jet engine as defined in claim 6 characterized by said driving means being in the form of box gearing comprising at least three right angularly arranged and successively intermeshed bevel gears with a parallel pair thereof intervened by one connected to said starting motor means, said bevel gears of said parallel pair being respectively connected to said shaft and hub for the opposite drive thereof.

No references cited.